United States Patent
Quinn et al.

(10) Patent No.: US 8,225,969 B2
(45) Date of Patent: Jul. 24, 2012

(54) APPARATUS FOR ATTACHING COMPONENTS TO A VEHICLE

(75) Inventors: Shawn G. Quinn, Grand Blanc, MI (US); David B. Declerck, Auburn Hills, MI (US); Tehui Peng, Rochester Hills, MI (US); Brian J. Schachermeyer, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 630 days.

(21) Appl. No.: 12/404,457

(22) Filed: Mar. 16, 2009

(65) Prior Publication Data
US 2010/0230449 A1  Sep. 16, 2010

(51) Int. Cl.
*B60R 7/00* (2006.01)
*B60R 16/04* (2006.01)

(52) U.S. Cl. .......... 224/42.38; 224/42.4; 224/567; 224/571; 224/902; 180/68.5

(58) Field of Classification Search .......... 224/431, 224/459, 537, 42.4, 42.32, 539, 547, 567, 224/571, 902, 42.38; 248/220.21, 222.13, 248/222.51, 223.41, 224.61; 180/68.5; 429/96, 429/100
See application file for complete search history.

(56) References Cited

U.S. PATENT DOCUMENTS

| | | | | |
|---|---|---|---|---|
| 2,980,195 A * | 4/1961 | Herbst | | 180/68.5 |
| 3,165,163 A * | 1/1965 | Holka | | 180/68.5 |
| 3,243,153 A * | 3/1966 | Kelly et al. | | 248/231.21 |
| 3,651,883 A * | 3/1972 | Aldag | | 180/68.5 |
| 5,813,641 A * | 9/1998 | Baldwin | | 248/223.41 |
| 6,230,833 B1 * | 5/2001 | Setsuda | | 180/68.5 |
| 6,230,834 B1 * | 5/2001 | Van Hout et al. | | 180/68.5 |
| 7,607,502 B2 * | 10/2009 | Boville | | 180/68.5 |
| 7,726,427 B2 * | 6/2010 | Picavet | | 180/68.5 |
| 7,845,528 B2 * | 12/2010 | McMillan | | 224/328 |
| 8,051,934 B2 * | 11/2011 | Kiya et al. | | 180/68.5 |
| 2002/0079152 A1 * | 6/2002 | Van Hout et al. | | 180/68.5 |
| 2011/0104558 A1 * | 5/2011 | Quinn et al. | | 429/163 |

FOREIGN PATENT DOCUMENTS

WO  WO 2007039003 A1 * 4/2007

* cited by examiner

*Primary Examiner* — Justin Larson
(74) *Attorney, Agent, or Firm* — Ingrassia Fisher & Lorenz P.C.

(57) ABSTRACT

A mounting apparatus is provided for securing a component to a base on a vehicle. The component has a first longitudinal lip extending along a first side thereof and a second longitudinal lip extending along a second side substantially opposite the first side. The mounting apparatus comprises an elongate track assembly configured to be fixedly coupled to the base and having first and second edge sections. The first edge section is configured to secure the first lip, and the second edge section is configured to form a wall. A wedge assembly is coupled to the track assembly for engaging the wall and the second lip to secure the component on the track assembly.

13 Claims, 6 Drawing Sheets

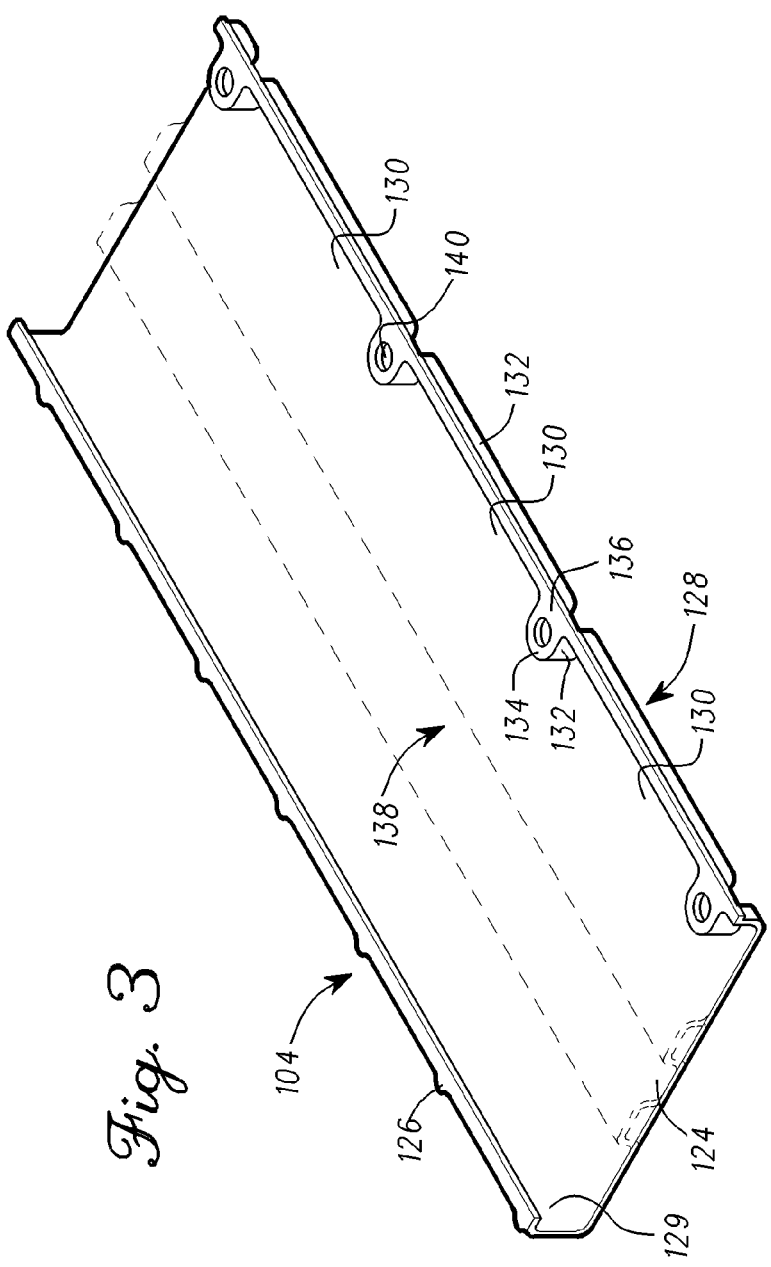
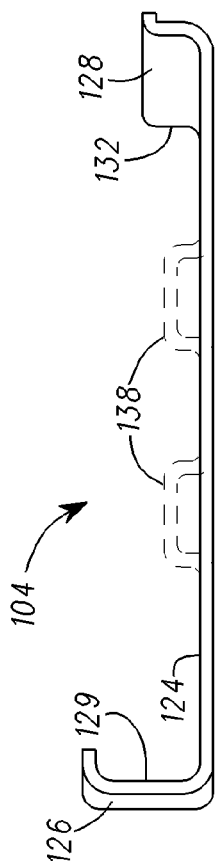

APPARATUS FOR ATTACHING COMPONENTS TO A VEHICLE

TECHNICAL FIELD

This relates generally to an apparatus for securing components to a support structure, and more particularly to a hold-down apparatus for attaching components to a vehicle.

BACKGROUND

In recent years, advances in technology have led to substantial changes in the design of automobiles. One of these changes involves the complexity, as well as the power usage, of various electrical systems within automobiles, particularly those within alternative fuel vehicles. For example, alternative fuel vehicles such as hybrid vehicles often use electrochemical power sources, such as batteries, ultracapacitors, and fuel cells, to power the electric traction machines (or motors) that drive the wheels, sometimes in addition to another power source such as an internal combustion engine.

Such changes present a myriad of challenges that relate to, among other things, the positioning, packaging, and securing of new and/or modified components in and on the vehicle. To meet the challenges, a hold-down apparatus should require a minimum of packaging area while still providing a high degree of stability. At the same time, the hold-down apparatus should be sufficiently versatile so as to accommodate production and/or environmental variations. Last but not least, low cost to the consumer is always a priority. Thus, a hold-down apparatus should provide high stability without significant increase in cost or complexity.

Accordingly, it is desirable to provide a component mounting apparatus, for use on a vehicle, that is versatile and requires a minimum of space. It is further desirable that the component mounting apparatus is relatively simple and inexpensive.

SUMMARY

In accordance with an embodiment, a mounting apparatus is provided for securing a component to a base on a vehicle. The component has a first longitudinal lip extending along a first side thereof and a second longitudinal lip extending along a second side, substantially opposite the first side. The mounting apparatus comprises an elongate track assembly fixedly coupled to the base and having first and second edge sections, the first edge section configured to secure the first lip. The second edge section is configured to form a wall. A wedge assembly is coupled to the track assembly for engaging the wall and the second lip to secure the component on the track assembly.

DESCRIPTION OF THE DRAWINGS

The embodiments will hereinafter be described in conjunction with the following drawing figures, wherein like numerals denote like elements.

FIG. 3 is an isometric view of an exemplary track assembly for use in the apparatus shown in FIGS. 1 and 2;

FIG. 4 is a cross-sectional view of the track assembly shown in FIG. 3;

DESCRIPTION OF AN EXEMPLARY EMBODIMENT

The following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to semiconductor processing, transistor theory, packaging, and power modules are not described in detail herein.

The following description refers to elements or nodes or features being "connected" or "coupled" together. As used herein, unless expressly stated otherwise, "connected" means that one element/node/feature is directly joined to (or directly communicates with) another element, node or other feature in mechanical, logical, electrical or other appropriate sense. Likewise, unless expressly stated otherwise, "coupled" means that one element/node/feature is directly or indirectly joined to (or directly or indirectly communicates with) another element/node/feature in a mechanical, logical, electrical or other appropriate sense. The term "exemplary" is used in the sense of "example," rather than "model." Further, although the figures may depict example arrangements of elements, additional intervening elements, devices, features, or components may be present in a practical embodiment of the invention.

Figure 1:
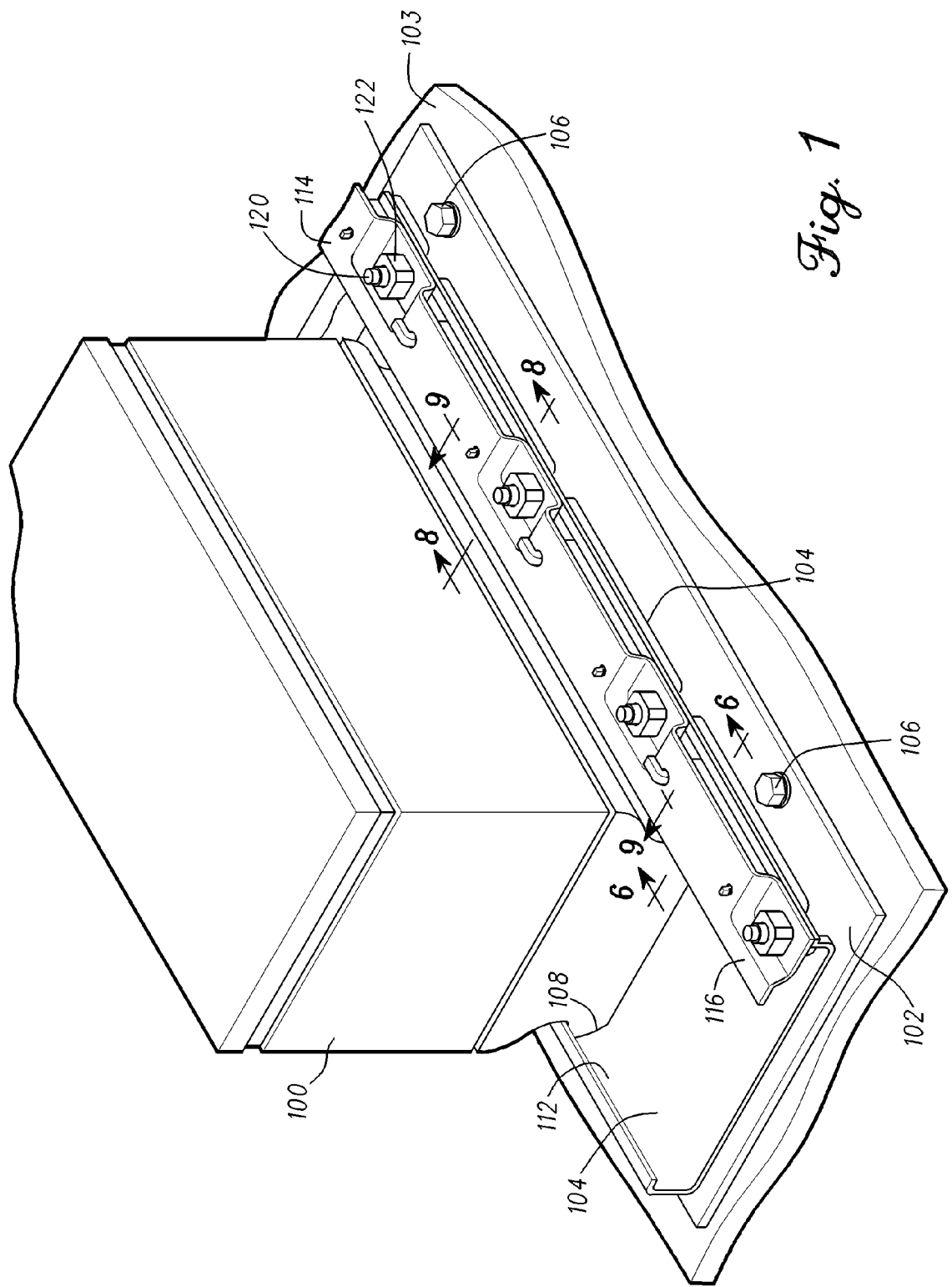
FIG. 1 is an isometric view of a component mounting apparatus in accordance with a first exemplary embodiment.
Figure 2:
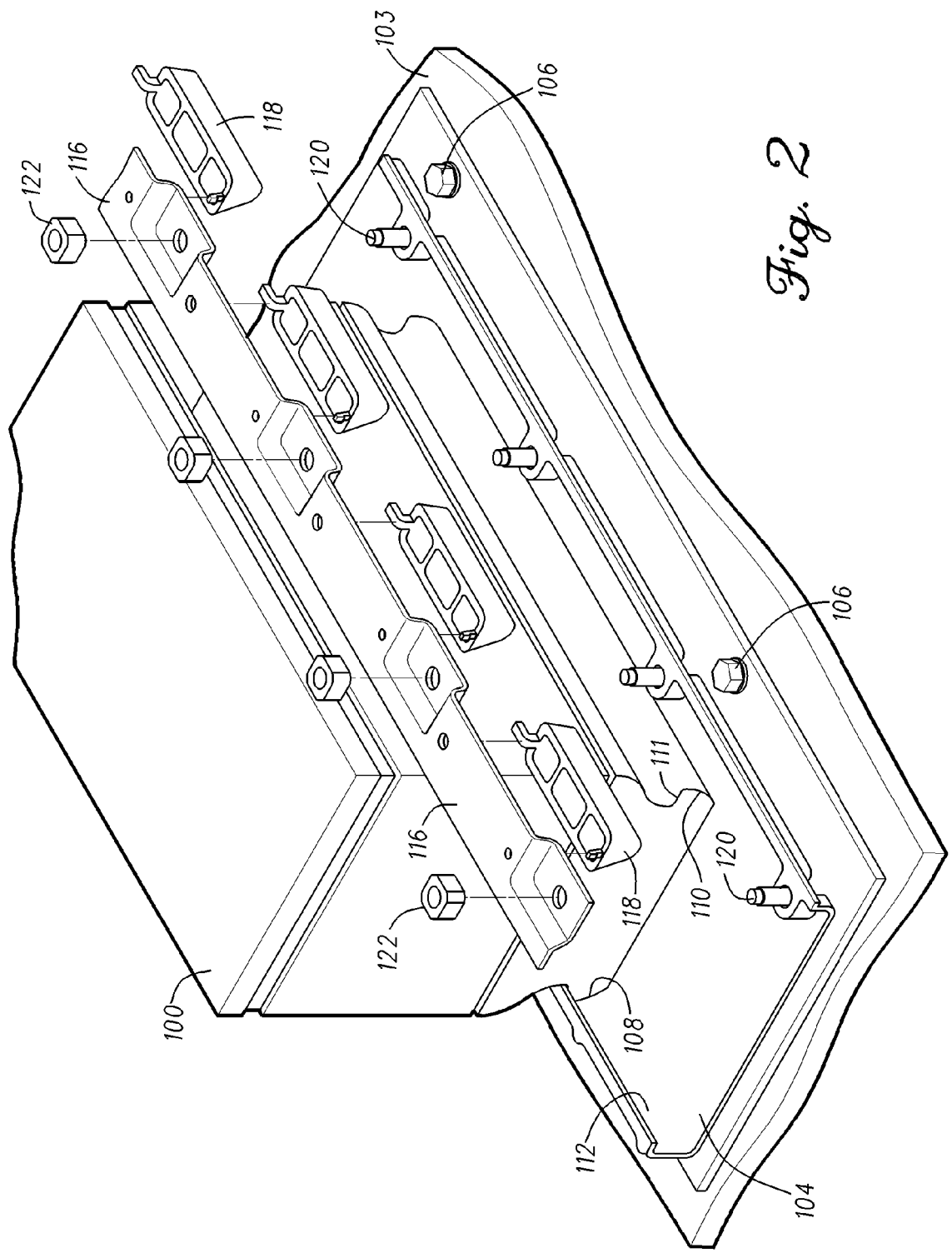
FIG. 2 is an exploded view of the apparatus shown in FIG. 1.

FIG. 1 is an isometric view of a first exemplary embodiment of a hold-down apparatus for mounting and securing a component 100 to a base 102 on a vehicle 103; e.g. automobile, utility vehicle, aircraft, tank, boat, etc. FIG. 2 is an exploded view of the exemplary apparatus shown in FIG. 1. Referring to both FIGS. 1 and 2, a base 102 is secured to a vehicle 103 by means of fasteners 106. An exemplary elongate track assembly 104 is secured to base 102 by means of fasteners 120; (e.g. weld studs) that also pass through base 102. The first and second substantially opposite bottom sides of component 100 are provided with first and second longitudinal lips 108 and 110, respectively, the first of which (108) is secured by a substantially concave elongate cavity 112 in a manner described more fully hereinafter. A wedge assembly 114 (FIG. 1) comprises a hold-down bracket 116 configured to receive and support a plurality of wedges 118. Hold-down bracket 116, and thus wedges 118, is secured to track assembly 104 by means of fasteners 120 (e.g. weld studs and nuts 122). As will become clear from the following description, when wedge assembly 114 is secured in place, hold-down bracket 116 engages an upper surface 111 (FIG. 2) of lip 110 on component 100 to vertically secure component 100. In addition, inboard surfaces of wedges 118 will engage another surface of lip 110 to laterally secure component 100.

FIGS. 3 and 4 are isometric and cross-sectional views respectively of track assembly 104 shown in FIG. 2. Referring to FIGS. 3 and 4, elongate track assembly 104, made of, for example, stamped steel, comprises a substantially flat central region 124 between a first edge region 126 and a second edge region 128. In this embodiment, first edge region 126 takes the form of an inward facing concavity 129 configured to receive and secure lip 110 shown in FIG. 2. Second edge section 128 comprises a plurality of recesses 130 formed generally by an upwardly extending wall 132. Between recesses 130, wall 132 extends outwardly to form a plurality of protrusions 134 directed toward central region 124. Wall 132 has an upper surface 136 that is substantially parallel to central region 124. Openings 140 are provided in wall 136 for reasons described below. The process of securing component 100 (FIG. 1) onto track assembly 104 begins by maneuvering lip 108 (FIG. 2) into concave edge section 126 and lowering lip 110 of component 100 (FIG. 2) until lip 110 comes to rest adjacent edge section 128; more specifically, adjacent protrusions 134. If desired, an optional guiderail assembly 138 shown dotted may be formed in central region 124 and configured to receive a complementary surface on the underside (not shown) of component 100.

Figure 5:
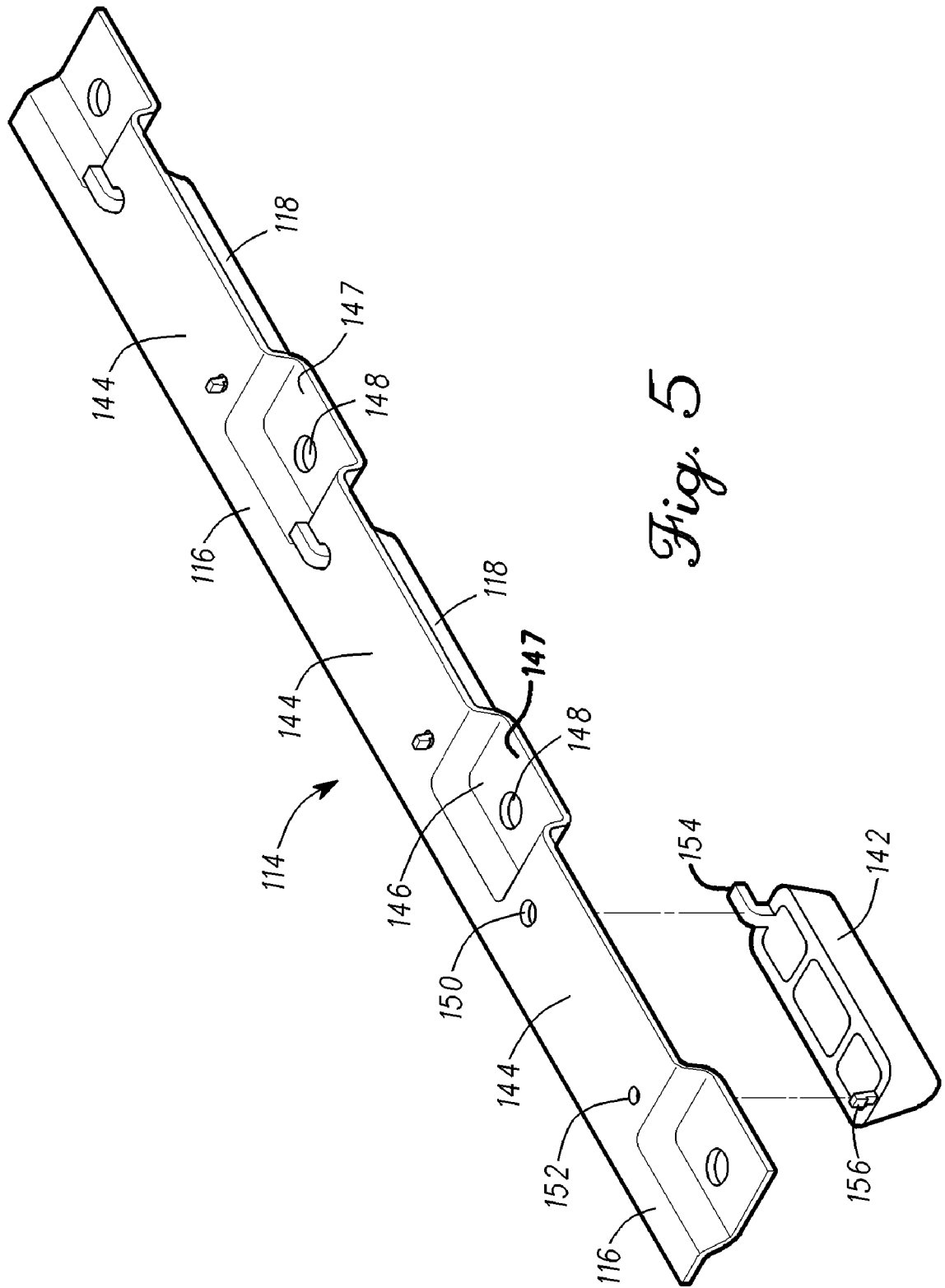
FIG. 5 is an exploded view of an wedge assembly for use in the apparatus shown in FIGS. 1-4.

FIG. 5 is an exploded isometric view of wedge assembly 114 shown in FIG. 1. It comprises an elongate hold-down bracket 116 shown in FIG. 2 and a plurality of wedges 118, one of which, 142, is shown enlarged. Hold-down bracket 116 is made, for example, of stamped steel, and wedges 118 are comprised of a resilient material such as nylon, a composite material, etc. As can be seen, hold-down bracket 116 is comprised of a plurality of substantially flat regions 144 each separated by an indented region 146 having a generally flat lower surface 147 and an aperture 148 therethrough for receiving one of fasteners 120 (FIGS. 1 and 2). Each flat region 144 is provided with first and second apertures therethrough 150 and 152, respectively, for receiving hook and snap connectors 154 and 156, respectively, so as to secure wedges 118 to the underside of flat regions 144. Thus, after component 100 is positioned on track assembly 104 as previously described, wedge assembly is positioned on fasteners 120 and secured thereby to track assembly 104. In so doing, the rear assembly or inboard edge of hold-down bracket 116 engages an upper surface of lip 110 to vertically secure component 100. Inboard surfaces of wedges 118 engage lip 110 (shown below) to laterally secure component 100.

Figure 6:
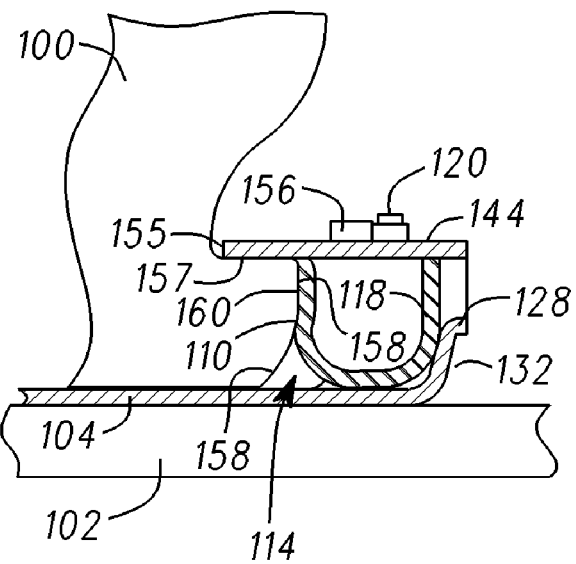
FIG. 6 is a cross-sectional view of the wedge assembly shown in FIG. 5 taken along line 6-6 in FIG. 1.

FIG. 6 is a partial cross-sectional view taken along line 6-6 in FIG. 1. As can be seen, when wedge assembly 114 is secured into place by fasteners 120, an inboard edge 155 of hold-down bracket 144 engages and resides upon an upper surface 157 of lip 110 to provide vertical stability for component 100. An inboard edge 158 of wedge 118 engages lower surface 160 of lip 110 to provide lateral stability.

Figure 7:
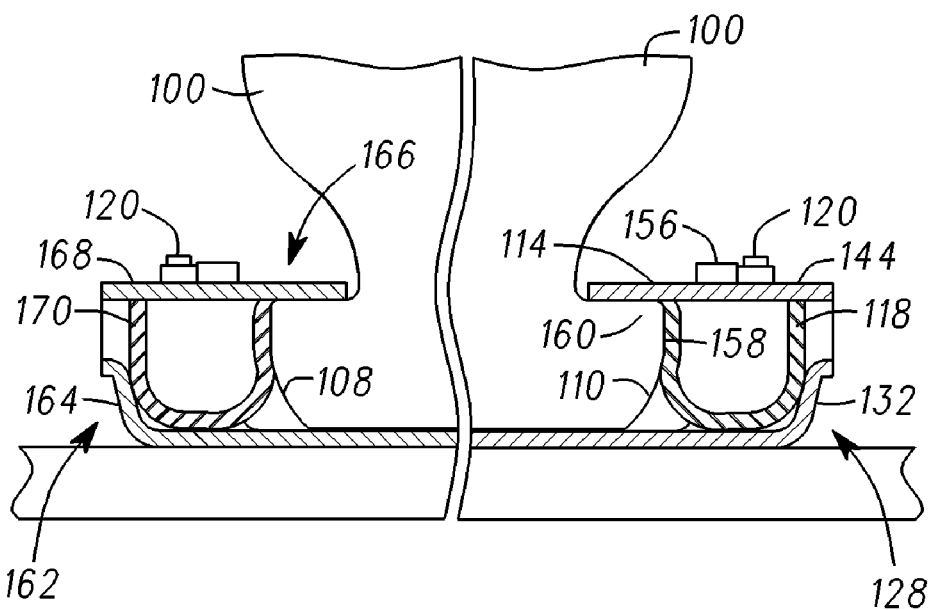
FIG. 7 is a cross-sectional view of another embodiment of the component mounting apparatus.

FIG. 7 illustrates a second embodiment wherein the first edge section 126 shown in FIGS. 3 and 4 is replaced by edge section 162 configured similarly to second edge section 128 described above in connection with FIGS. 3 and 4. However, the inwardly facing concavity 130 is replaced by wall 164 and a second wedge assembly 166 that includes a second hold-down bracket 168 and a second plurality of wedges 170. Thus, edge section 162 is generally a mirror image of edge section 128. The second wedge assembly 166, including the second hold-down bracket 168 and the second plurality of wedges 170 (again, the mirror image of hold-down bracket 144 and wedges 118), engages lip 108 (FIG. 2) to secure component 100 both vertically and laterally as described previously in connection with hold-down bracket 144 and wedges 118.

Figure 8:
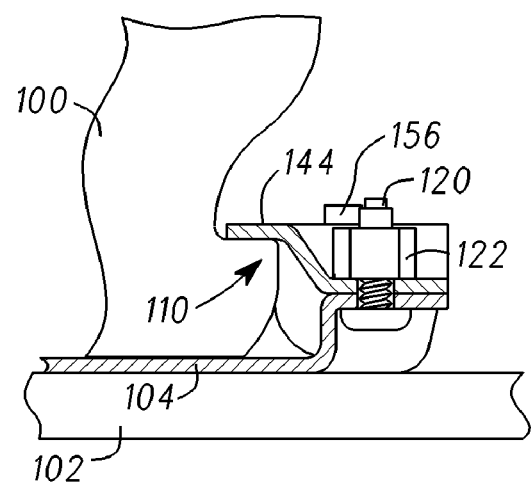
FIG. 8 is a partial cross-sectional view taken along line 8-8 in FIG. 1.

FIG. 8 is a partial cross-sectional view taken along line 8-8 in FIG. 1. As can be seen, this section is taken through one of indentations 146 (FIG. 5) and aperture 148 that receives a fastener 120 for securing the hold-down bracket 144 to track assembly 104. As can be seen, hold-down bracket 144 engages an upper surface of lip 110.

Figure 9:
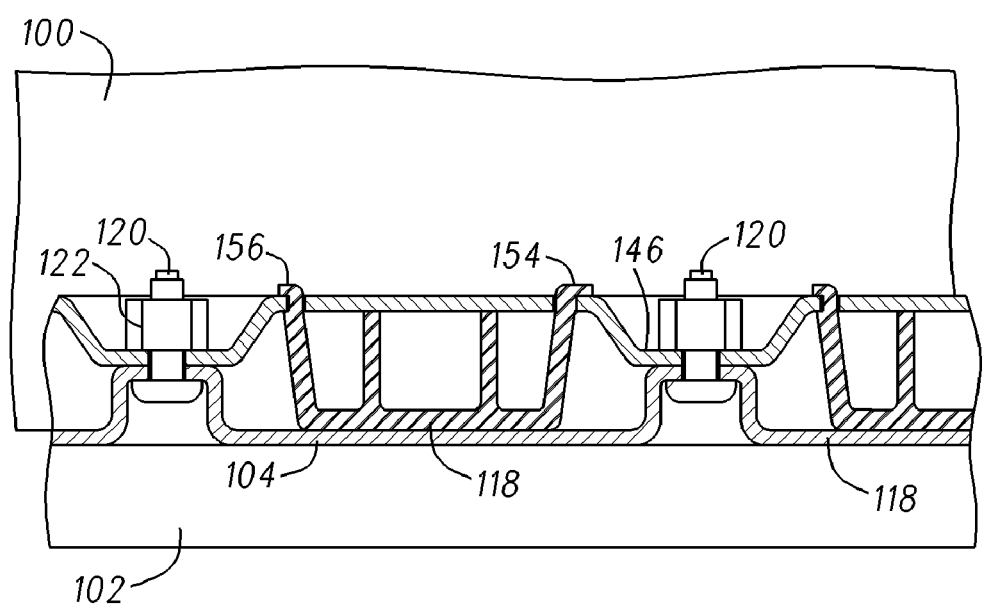
FIG. 9 is a partial cross-sectional view taken along line 9-9 in FIG. 1.

FIG. 9 is a partial cross-sectional view taken along line 9-9 in FIG. 1. Wedges 118 are secured to hold-down bracket 144 by means of hooks 154 and snaps 156. Hold-down bracket 146 is then secured to track assembly 104 by fasteners 120.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A mounting apparatus for securing a component to a base on a vehicle, the component having a first longitudinal lip extending along a first side thereof and having a second longitudinal lip extending along a second side substantially opposite the first side, the mounting apparatus comprising:
    an elongate track assembly fixedly coupled to the base and having a first and second edge sections and an intermediate central region, the first edge section configured to secure the first lip, and the second edge section configured to form a first wall; and
    a first wedge assembly coupled to the track assembly for engaging the first wall and the second lip to secure the component on the track assembly wherein the first wedge assembly comprises:
    an elongate body configured to be coupled to the track assembly and having a substantially flat region; and
    a wedge coupled to the substantially flat region beneath the flat region and configured to engage the first wall and the second lip;
    wherein the elongate body comprises a plurality of substantially flat regions each separated by a indented region wherein the first wedge assembly comprises a plurality of wedges, each wedge coupled to a different one of the plurality of flat regions and configured to engage the first wall and the second lip;
    wherein each of the plurality of wedges comprises first and second connectors and wherein each flat region includes first and second apertures for receiving the first and second connectors, respectively.

2. A mounting apparatus for securing a component to a base on a vehicle, the component having a first longitudinal lip extending along a first side thereof and having a second longitudinal lip extending along a second side substantially opposite the first side, the mounting apparatus comprising:
    an elongate track assembly fixedly coupled to the base and having a first and second edge sections and an intermediate central region, the first edge section configured to secure the first lip, and the second edge section configured to form a first wall; and
    a first wedge assembly coupled to the track assembly for engaging the first wall and the second lip to secure the component on the track assembly wherein the first wedge assembly comprises:
an elongate body configured to be coupled to the track assembly and having a substantially flat region; and
a wedge coupled to the substantially flat region beneath the flat region and configured to engage the first wall and the second lip;
wherein the elongate body comprises a plurality of substantially flat regions each separated by a indented region wherein the first wedge assembly comprises a plurality of wedges, each wedge coupled to a different one of the plurality of flat regions and configured to engage the first wall and the second lip;
wherein the first wall has an upper surface and is configured to form a a plurality of inwardly directed protrusions each separated by one of a plurality of recesses; and
wherein each one of the indented regions is configured to be fixedly coupled to the upper surface of one of the plurality of protrusions.

3. An apparatus according to claim 2, wherein the elongate body engages the second lip to secure the component when the substantially flat regions are fixedly coupled to the plurality of protrusions.

4. A mounting apparatus for securing a component to a base on a vehicle, the component having first and second longitudinal lips extending along a first and second substantially opposite sides, respectively, thereof, the mounting apparatus comprising:
an elongate track assembly fixedly coupled to the base and having a central region and first and second retaining edge assemblies, the first retaining edge assembly configured to receive and secure the first lip; and
a wedge assembly configured to be coupled to the track assembly, the wedge assembly comprising:
an elongate body configured to be coupled to the track assembly; and
a wedge coupled to the elongate body and configured to engage the second lip and the second retaining edge assembly;
wherein the elongate body comprises a plurality of substantially flat regions, separated by a plurality of recessed regions, each recessed region configured to be coupled to the track assembly;
wherein the wedge assembly comprises a plurality of wedges, each wedge coupled to a different one of the plurality of flat regions and configured to engage the second lip and the second retaining edge assembly;
wherein the second retaining edge assembly comprises a wall having an upper surface and configured to form a a plurality of protrusions directed towards the central region; and
wherein the upper surface of each one of the plurality of protrusions is configured to be coupled to a different one of the plurality of the recessed regions.

5. A mounting apparatus according to claim 4, wherein the elongate body engages the second lip when the plurality of recessed regions is coupled to the plurality of protrusions.

6. A mounting apparatus for securing a component to a base on a vehicle, the component having first and second retaining lips extending along a first and second substantially opposite sides thereof, respectively, the mounting apparatus comprising:
an elongate track assembly configured to be fixedly coupled to the base, the track assembly having a central region and first and second edge assemblies, the first edge assembly configured to receive and secure the first lip; and
a wedge assembly configured to be coupled to the track assembly and the component, the wedge assembly comprising:
an elongate body including a plurality of first regions each separated by one of a plurality of second regions, the first regions configured to be coupled to the track assembly; and
a plurality of wedges each removeably coupled to one of the second regions and configured to engage the second edge assembly and the second lip when the first regions are coupled to the track assembly.

7. An apparatus according to claim 6, wherein the second edge assembly comprises a wall having an upper surface and configured to form a plurality of protrusions each configured to be coupled to one of the plurality of first regions.

8. A mounting apparatus for securing a component to a base on a vehicle, the component having a first longitudinal lip extending along a first side thereof and having a second longitudinal lip extending along a second side substantially opposite the first side, the mounting apparatus comprising:
an elongate track assembly fixedly coupled to the base and having a first and second edge sections and an intermediate central region, the first edge section configured to secure the first lip, and the second edge section configured to form a first wall; and
a first wedge assembly coupled to the track assembly for engaging the first wall and the second lip to secure the component on the track assembly;
wherein the first wedge assembly comprises an elongate body configured to be coupled to the track assembly and having a substantially flat region, and a wedge coupled to the substantially flat region beneath the flat region and configured to engage the first wall and the second lip; and
wherein the wedge is removeably coupled to the flat region, wherein the elongate body comprises a plurality of substantially flat regions each separated by a indented region.

9. An apparatus according to claim 8, wherein the first wedge assembly comprises a plurality of wedges, each wedge coupled to a different one of the plurality of flat regions and configured to engage the first wall and the second lip.

10. An apparatus according to claim 9, wherein the first wall has an upper surface and is configured to form a a plurality of inwardly directed protrusions each separated by one of a plurality of recesses.

11. A mounting apparatus for securing a component to a base on a vehicle, the component having first and second longitudinal lips extending along a first and second substantially opposite sides, respectively, thereof, the mounting apparatus comprising:
an elongate track assembly fixedly coupled to the base and having a central region and first and second retaining edge assemblies, the first retaining edge assembly configured to receive and secure the first lip; and
a wedge assembly configured to be coupled to the track assembly, the wedge assembly comprising:
an elongate body configured to be coupled to the track assembly; and
a wedge removeably coupled to the elongate body and configured to engage the second lip and the second retaining edge assembly, wherein the elongate body comprises a plurality of substantially flat regions, separated by a plurality of recessed regions, each recessed region configured to be coupled to the track assembly.

12. A mounting apparatus according to claim 11, wherein the wedge assembly comprises a plurality of wedges, each wedge coupled to a different one of the plurality of flat regions and configured to engage the second lip and the second retaining edge assembly.

13. A mounting apparatus according to claim 12, wherein the second retaining edge assembly comprises a wall having an upper surface and configured to form a plurality of protrusions directed towards the central region.

* * * * *